US006765600B2

(12) United States Patent
Yamagishi et al.

(10) Patent No.: US 6,765,600 B2
(45) Date of Patent: Jul. 20, 2004

(54) TIME RECORDER WITH A CARD FEED RATE ADJUSTMENT FUNCTION AND TIME CARD FOR USE IN THE SAME

(75) Inventors: Hiroaki Yamagishi, Yokohama (JP); Hirosada Watanabe, Yokohama (JP); Masayuki Mochizuki, Yokohama (JP); Daisuke Fujita, Yokohama (JP)

(73) Assignee: Amano Corporation, Kanagawa-ken (JP)

( * ) Notice: Subject to any disclaimer, the term of this patent is extended or adjusted under 35 U.S.C. 154(b) by 219 days.

(21) Appl. No.: 10/147,913

(22) Filed: May 20, 2002

(65) Prior Publication Data

US 2003/0025739 A1 Feb. 6, 2003

(30) Foreign Application Priority Data

May 22, 2001 (JP) ...................................... 2001-152808

(51) Int. Cl.[7] ......................... G01D 15/04; G01D 15/20
(52) U.S. Cl. ......................................................... 346/83
(58) Field of Search .............................. 346/83, 78, 82, 346/81, 98, 134, 133, 129, 104, 99, 94; 101/415.1

(56) References Cited

U.S. PATENT DOCUMENTS 5,917,790 A * 6/1999 Ohta et al. ............... 369/44.29

FOREIGN PATENT DOCUMENTS

JP 08101935 4/1996

* cited by examiner

*Primary Examiner*—Raquel Yvette Gordon
(74) *Attorney, Agent, or Firm*—Stevens, Davis, Miller & Mosher, LLP.

(57) ABSTRACT

The present invention provides a time recorder with a card feed rate adjustment function making it possible to print data for arrival and departure times to and from a job side at a correct position within a print column by adjusting a feed rate for a time card according to extension or shrinkage of the time card or characteristics of the time card such as a printing state within the print column. An adjustment value is computed by reading a start point and an end point printed on a time card TA or TB inserted into the time recorder with the mark sensors 10, 11 and counting a feed rate for the time card TA or TB from the start point to the end point with the encoder sensor 12, and a feed rate for the car is adjusted according to the computed adjustment value.

17 Claims, 9 Drawing Sheets

TIME RECORDER WITH A CARD FEED RATE ADJUSTMENT FUNCTION AND TIME CARD FOR USE IN THE SAME

FIELD OF THE INVENTION

The present invention relates to a time recorder with a card feed rate adjustment function making it possible to correctly print one's arrival or departure time in a print column by adjusting a card feed rate even when a card feed rate changes due to a processing error by or a seasonal change of a card carrier roller or when the print column changes due to shrinkage or extension of the time card as well as to a time card adapted to use in this time recorder.

PRIOR ART

The time recorder with a card feed rate adjustment function as described above is disclosed, for instance, in Japanese Patent Laid-Open Publication No. HEI 8-101935.

The time recorder disclosed in this publication has the configuration in which a test mark is provided on a maintenance card exclusively used for maintenance, and a mark sensor counts a number of pulses generated from an encoder, while this card is being fed, from a point of time when a lower edge of the card is detected by the card sensor until a point of time when the test mark is detected and compares this number of counted pulses to a preset standard number of pulses to calculate a correction value, and a time card is fed according to the number of pulses corrected according to this correction value.

PROBLEMS TO BE SOLVED BY THE INVENTION

In the conventional type of time recorder as described above, as a correction value for adjusting a card feed rate is computed by using a maintenance card exclusively used for adjustment which is completely different from a time card used for printing one's arrival or departure time, when a time card is actually inserted and the card is fed according to the correction value computed as described above, an error may occur in feeding the card, which in turn may disadvantageously make it difficult to correctly print the time data in a print column.

Namely, in the conventional technology, a maintenance card and a time card which is used daily are generally produced by different manufacturers through different production processes respectively, and even if the maintenance card and time card are produced based on the same specifications, there are usually some differences between the two types of cards, and especially a copy product may be produced and used as a time card, or those produced in different factories are sometimes used in the same time recorder, and in that case paper qualities of the cards may be different, and the cards extend or shrink from season to season, and therefore it is very difficult to uniformly control a feed rate of each of the time cards having different properties and characteristics respectively according to a correction value computed using the maintenance card, and as a result even though a feed rate for the cards is adjusted, sometimes the printed letters are sometimes partially or wholly off from the print column of each time card, which makes it disadvantageously difficult to beautifully print time and date within the print column.

Therefore a technological object of the present invention is to provide a time recorder with a card feed rate adjustment function capable of printing one's arrival or departure time to and from a job site always at a correct position within a print column by adjusting a feed rate of each time card according to such parameters as a paper quality or a degree of extension or shrinkage or a printing state within the print column.

Another technological object of the present invention is to provide a time card well adapted to use in the time recorder with a card feed rate adjustment function described above.

MEANS FOR SOLVING THE PROBLEMS

The technological objects described above can be achieved by the features of the present invention described below.

(1) The present invention provides a time recorder with the operation mode capable of being switched between a print mode and a set mode and feeding a time card inserted therein up to a data time data stamping step position for stamping a current date with a card carrier motor and stamping the date when the operation mode is switched to the print mode is set and also adjusting a feed rate for the time card when operation mode is switched to the set mode, and this time recorder comprises a sensor for reading a start point and an end point for measurement of a feed rate provided on an inserted time card, an encoder for counting a feed rate of the time card fed from a point of time when the start point is read until a point of time when the end point is read, an adjustment value computing means for computing an adjustment value for adjusting the feed rate by comparing the counted feed rate to a preset basic feed rate, and an adjustment value registration means for registering the computed adjustment value as step pitch adjustment data, each of which is each enabled when the operation mode of the time recorder is switched to the set mode, and the time recorder further comprises a feed rate control means for adjusting a feed rate of the time card by the card carrier motor according to the registered step pitch adjustment data to carry the time card to the time data stamping step position for the current data when the operation mode is the time recorder is set to the print mode. (claim 1)

(2) The present invention provides a time recorder with a card feed rate adjustment function capable of feeding an inserted time card to a time data stamping step position with a card carrier motor for stamping a current date, and this time recorder comprises a sensor for reading a start position and an end position for measurement of a feed rate provided on the inserted time card, an encoder for counting a feed rate for a time card fed from a point of time when the start point is read until a point of time when the end point is read, an adjustment value computing means for computing an adjustment value for adjusting the feed rate by comparing the counted feed rate to a preset basic feed rate, a print position computing means for computing a time data stamping step position for stamping the current data according to the computed adjustment means, and a feed rate control means for controlling the card carrier mote to carry the time card to the computed time data stamping step position. (claim 2)

(3) In the time recorder with a card feed rate adjustment function according to the present invention, there is further provided an update and registration means for updating and registering a feed rate counted by the encoder as new step pitch adjustment data. (claim 3)

(4) In the time recorder with a card feed rate adjustment function according to the present invention, a start mark and an end mark printed with a space therebetween in a lower section and an upper section of a time card respectively are used as a start position and an end position for measurement of a feed rate.(claim 4)

(5) In the time recorder with a card feed rate adjustment function according to the present invention, a start mark and an end mark for ID code printed on a time card are used as a start point and an end point for measurement of a feed rate. (claim 5)

(6) In the time recorder with a card feed rate adjustment function according to the present invention, either one of a start mark or an end mark of an ID code printed on a time card is used as a start point for measurement of a feed rate for the time card and an end mark printed in an upper section of a time card at a position corresponding to the ID cord is used as an end point for measurement of a feed rate. (claim 6)

(7) In the time recorder with a card feed rate adjustment function according to the present invention, either one of a ruled line or a pattern printed along a lower edge of a time card or in a lower section thereof is used as a start position for measurement of a feed rate, and either one of a ruled position and a pattern printed along an upper edge of the time card or in an upper section thereof is used as an end point for measurement of the feed rate. (claim 7)

(8) The present invention provides a time card used in the time recorder with a card feed rate adjustment function, in which a start mark as a start position for measurement of a feed rate is printed in a lower section of the card and also an end mark as an end position for measurement of a feed rate is printed at a position corresponding to the start mark in an upper section of the card. (claim 8)

(9) The present invention provides a time card used in the time recorder with a card feed rate adjustment function, in which either one of a start mark and an end mark for an ID code printed on one side of a card is used as a start point for measurement of a feed rate and an end mark used as an end point for measurement of the feed rate is printed at a position corresponding to the ID code in an upper section of the card. (claim 9)

With the invention according to claim 1 described in (1) above, as a feed rate for a time card can be adjusted by using the same time card as that usually used, different from the case of printing one's arrival or departure time on a time card after adjustment of a feed rate performed by using a specific maintenance card like in the conventional technology, as there occur no displacement between the adjusted feed rate and actual printing due to differences in paper qualities of used time cards or those in the production processes or due to extension or shrinkage of the time cards, the data for one's arrival or departure time to and from the job site can clearly be printed within the print column.

With the invention according to claim 2 described in (2) above, a feed rate for a card is adjusted each time a time card is inserted into a time recorder, and then data for one's arrival or departure time is printed, so that the card can be fed based on the considerations to extension or shrinkage of each card or other parameters which vary according to the humidity from day to day and the data for one's arrival or departure time can always be printed at a correct position within the print column.

With the invention according to claim 3 described in (3) above, the step pitch adjustment data is updated each time printing is performed on a time card, so that it is possible to print data for one's arrival or departure time accurately within a print column for the current day.

With the invention according claim 4 described in (4) above, as a start mark and an end mark for measurement of a card feed rate are printed on a time card which is used every day and the time card can be used as a card for adjustment of a card feed rate as it is, and as a result, it is possible to print data for one's arrival or departure time at a correct position within the print column by accurately adjusting a feed rate for the card according to the computed feed rate.

With the inventions according to claims 5, 6, and 7 described in (5), (6) and (7) respectively, a time card with an ID code, a ruled line or the like printed thereon, which is used every day, can be used as a card for adjustment of a feed rate for the card, and as a result it is possible to carry the time card according to the computed feed rate and beautifully print data for one's arrival or departure time within the print column.

With the inventions according to claims 8, 9 described in (8) and (9) above respectively, it is possible to provide a time card adapted to use in the time recorder with a card feed rate adjustment function according to claims 4 and 6 Described in (4) and (6) respectively.

DETAILED DESCRIPTION OF THE EMBODIMENTS

Figure 1:
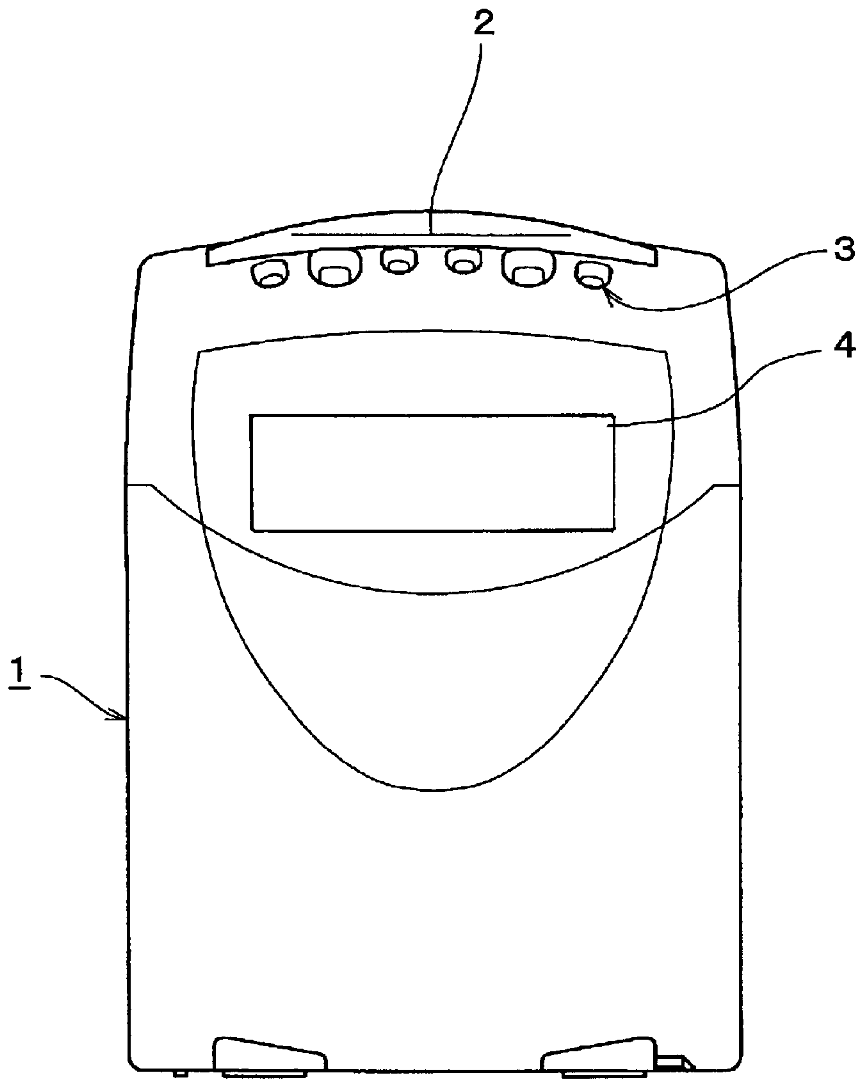
FIG. 1 is a front view showing a time recorder with a card feed rate adjustment function according to the present invention as a whole.

Embodiments of the time recorder with a card feed rate adjustment function and a time card for use in the time recorder each according to the present invention are described in detail below with reference to the related drawings. FIG. 1 is a front view showing the time recorder according to the present invention, while FIG. 2 is a block diagram showing the internal configuration of the time recorder, and in these figures designated at the reference numeral 1 is a time recorder, at 2 a card insertion port into which a time card TA or TB described below (See FIG. 4 and FIG. 5), at 3 an input device comprising a plurality of button switches, and at 4 a display unit for displaying a time, a message, or the like.

Figure 2:
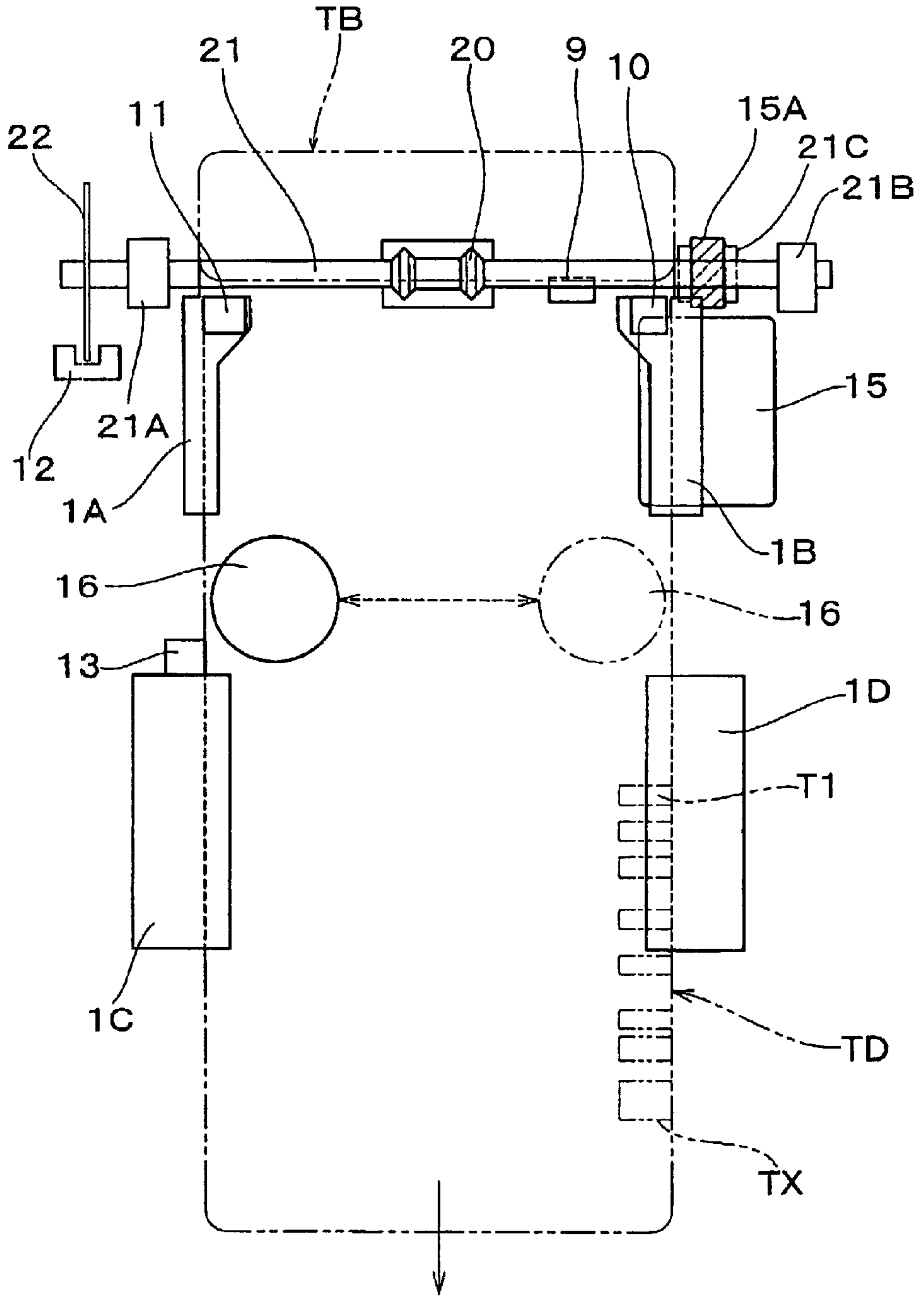
FIG. 2 is a block diagram showing the internal structure of the time recorder according to the present invention.

In FIG. 2, designated at the reference numerals 1A, 1B, 1C, and 1D are card guides provided inside the time recorder 1, at 21 a roller shaft rotatably supported by left and right bearings 21A, 21B, at 20 a card feed roller attached to this roller shaft 21, at 15 a card carrier motor, at 15A and 21C a drive worm in the side to the motor 15 and a worm gear abutting the worm 15A and moving correlatively thereto and provided on the roller shaft 21, and when a lower edge section of a time card TA or TB inserted from the card insertion port 2 is detected by a card detection sensor 9, the card carrier motor 15 starts rotation, and at the same time the roller shaft 21 starts rotation correlatively because of the engagement between the worm 15A and worm gear 21C to rotate the card feed roller 20, so that the inserted time card TA or TB is guided and fed by the card guides 1A to 1D into inside of the time recorder 1.

Further in FIG. 2, designated at the reference numeral 22 is an encoder disk plate attached to one edge of the roller shaft 21, at 12 an encoder sensor which detects rotation of this encoder disk plate 22 and measures a feed rate for the time card TA or TB based on rotation of the card, feed roller 20, at 10 and 11 a top mark sensor and a rear mark sensor which read ID code TD for a card or an employee printed on top and rear sides of the time card TA and TB, read start and end marks for measurement of a card feed rate described below, read lower and upper edges of the time card TA, TB in place of the marks above, or read a ruled line, a pattern or the like printed in lower and upper sections of the card, at 16 a dot printer for printing data for one's arrival or departure time on the inserted time card TA or TB, and at 13 a printer home position sensor.

With the time recorder 1 having the configuration as shown in FIG. 2 above, the mark sensor 10 or 11 reads the ID code from the time card TB being pulled and fed downward by the card feed roller 20 to determine a time data stamping step position for the date, feeds the card with the card carrier motor 15 monitoring with the encode sensor 12 so that the time data stamping step position is aligned to a print position for the dot printer 16, and then prints the data for one's arrival or departure time in the stamping step for the date on the time card TB with the dot printer 16.

Figure 3:
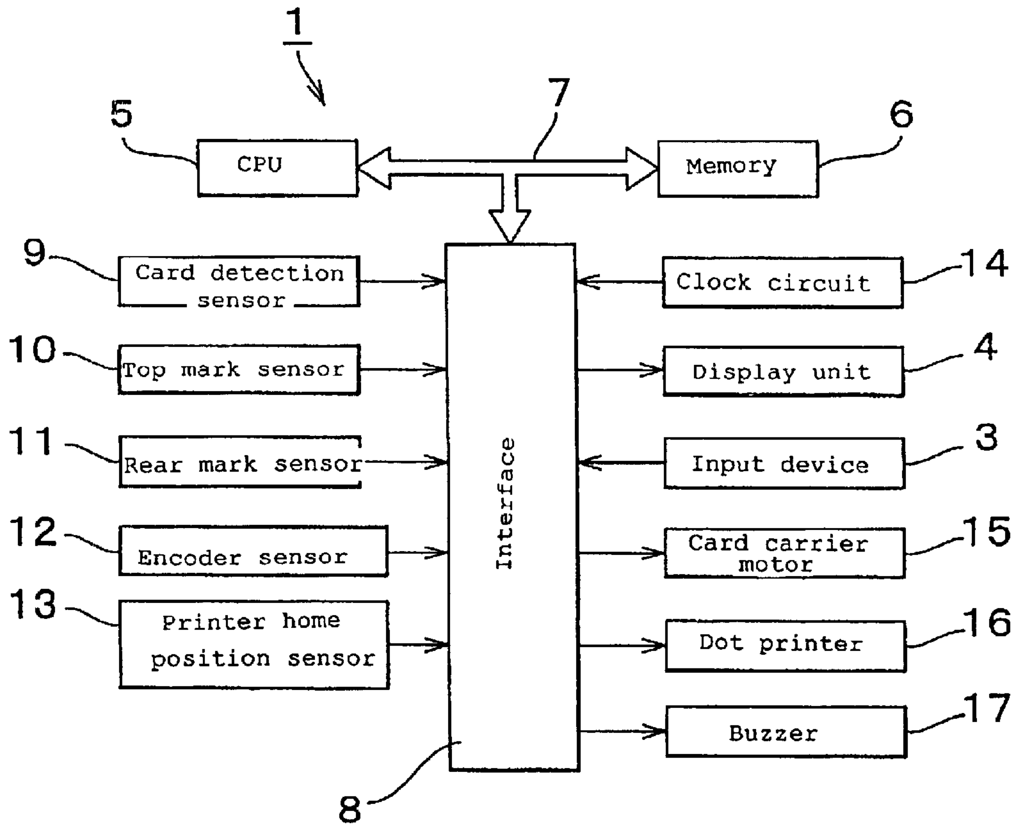
FIG. 3 is a block diagram illustrating electric configuration of the time recorder according to the present invention.

FIG. 3 is a block diagram illustrating electric configuration of the transmitter-receiver 1 according to the present invention described above, and in this figure, designated at the reference numeral 5 is a CPU constituting a central portion of the control section, at 6 a memory comprising a ROM and a RAM, and at 8 an interface connected via the bath 7 to a section between the CPU 5 and memory 6, and connected to this interface 8 are the card detection sensor 8, top and rear mark sensors 10, 11, encoder sensor 12, printer home position sensor 13, a clock circuit 14, a display unit 4, input device 3, card carrier motor 15, dot printer 16, and a buzzer 17 for generating a sound when an error occurs, and each of the components is discretely driven and controlled by a system program stored in the memory 6.

The present invention was made to solve the problem that, in the transmitter-receiver 1 having the configuration as described above, the dot printer 16 can not print data for one's arrival or departure time at a correct position within a specified stamping step (print column) because of such causes as a processing error by or changes of the card feed roller 20 associated with its use for a long time or changes in paper quality or extension or shrinkage of the time card TA or TB due to humidity, by adjusting a card feed rate by the card feed roller 20, and the specific configuration is described below.

Namely with the transmitter-receiver with a card feed rate adjustment function according to the present invention as described in claims 1 and 2, a start point and an end point for measurement of a feed rate provided on an inserted time card TA or TB is read by the top mark sensor 10 or rear mark sensor 11, and further a feed rate of the time card TA or TB from a point of time when the start point is read by the sensor 10 or 11 until a point of time when the end point is read by the sensor 10 or 11 is counted by the encoder sensor 12.

Figure 4:
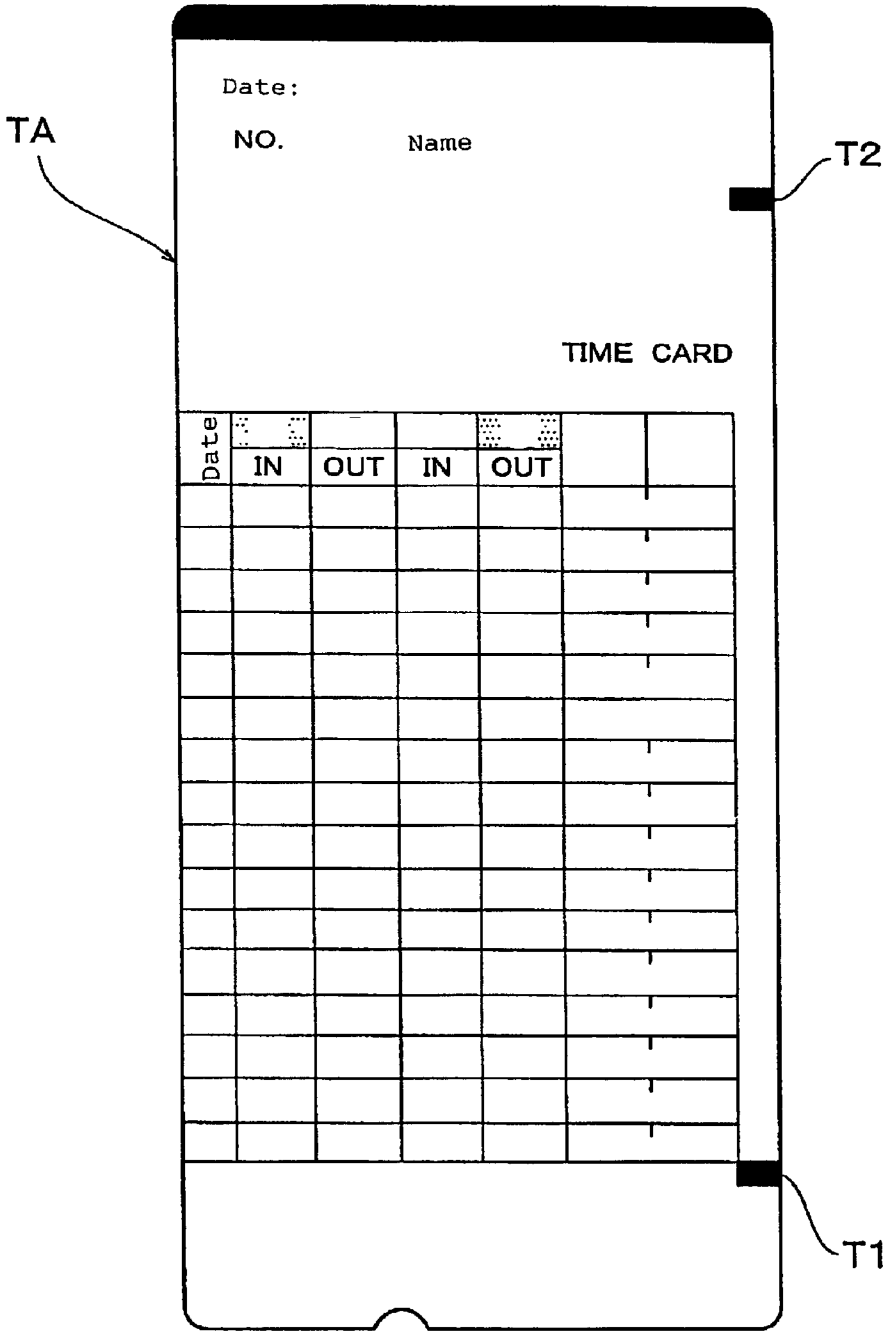
FIG. 4 is a front view illustrating configuration of a time card according to the present invention as described in claim 7.
Figure 5:
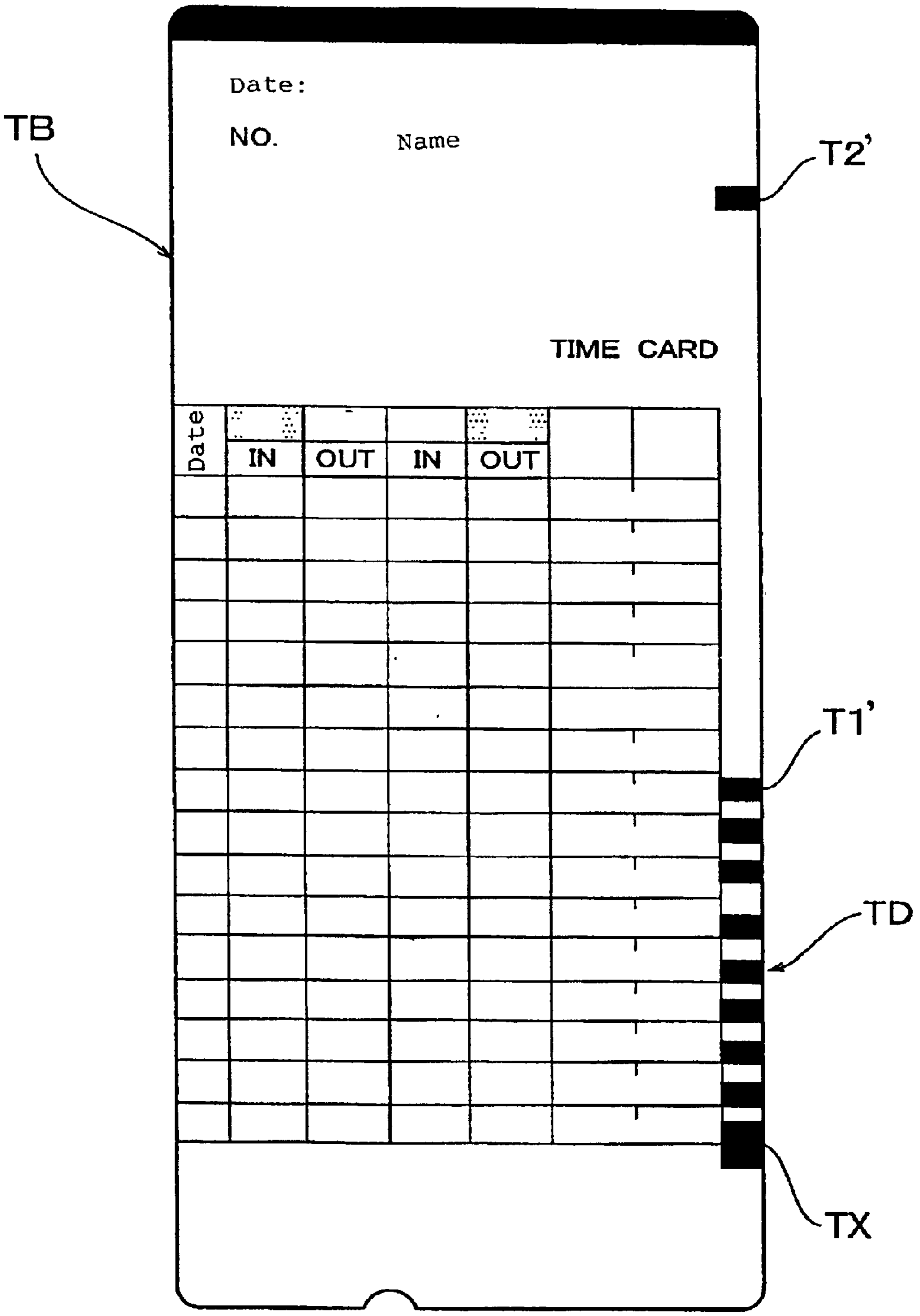
FIG. 5 is a front view showing configuration of a time card according to the present invention as described in claim 8.

For the start point and end point for measurement of a card feed rate, a start mark T1 and an end mark T2 previously printed in a lower section and an upper section each along an edge of the card in the case of the time card TA shown in FIG. 4 (claims 4 and 8). In the case of the time card TB with ID code for the card or an employee holding the card printed along an edge of the card as shown in FIG. 5, a start mark TX and an end mark TX' for the ID code TD (step control marks), or either one of these marks TX and TX' and an end mark T2' printed above the ID code TD are used.

Further, in some cases, in place of using the marks T1 and T2 or T1', T2', and TX, as described in claim 7, any of, a ruled line or a pattern printed along a lower edge of the time card TA or TB, or in a lower section of the card TA or TB is used as a start point, and at the same time any of a ruled line or a pattern printed along an upper edge of the card TA or TB, or in an upper section of the card TA or TB is used as an end point for measurement of a card feed rate.

With the time recorder according to the invention as described in claim 1, measurement of the feed rate is performed only when the operation mode of the TIME RECORDER 1 is set to the step pitch adjustment mode by operating the input device (FIG. 3), an adjustment value for adjusting a card feed rate is computed based on the measured feed rate with the computed adjustment value registered, and further the time card TA or TB is fed by adjusting the feed rate according to the registered adjustment value when the operation mode of the time recorder 1 is switched to the print mode to print one's arrival or departure time.

The measurement of a card feed rate is performed after the time card TA or TB, which is daily used, is inserted, and an adjustment value for adjusting the card feed rate is computed by comparing the feed rate for the card counted by the encoder counter 12 while the card is fed from the start point to the end point to a reference feed rate previously registered in the memory 6 (FIG. 3), and this computed adjustment value is registered as step pitch adjustment data in the memory 6 for use when subsequent cards are fed.

On the other hand, with the time recorder according to the invention described in claim 2, each time the operation mode of the time recorder 1 is set to the print mode and the time card TA or TB is inserted into the time recorder 1, measurement of the card feed rate and computing of an adjustment value are performed by comparing the feed rata to the step pitch adjustment data previously registered therein, the time card TA or TB is fed by controlling the card carrier motor 15 according to the computed step pitch adjustment data with one's arrival or departure time printed by the dot printer 16 at a time data stamping position for the date, while, in the case of the time recorder according to the invention as described in claim 3, the computed step pitch adjustment data is registered in the memory to update the data previously registered and stored therein for use in next printing.

For computing the adjustment value (step pitch adjustment data) and controlling a card feed rate according to the computed adjustment value is used the same adjustment method as that described in, for instance, Japanese Patent Laid-Open Publication No. HEI 8-101935, more specifically the method in which a number of pulses is counted by the encoder sensor 12 from a point of time when the mark sensor 10 or 11 detects a start point for the time card TA or TB until a point of time when the mark sensor 10 or 11 detects an end mark on the card, an adjustment value (new step pitch adjustment data) is computed by comparing the number of pulses to a reference pulse number (step pitch adjustment data) preset or previously registered therein, and the card TA or TB is fed by the card carrier motor 15 according to the pulse number adjusted according to the computed adjustment value, but this adjustment method is only one of examples, and it is needless to say that the adjustment method used in this invention is not limited to the system disclosed in the publication above.

Figure 6:
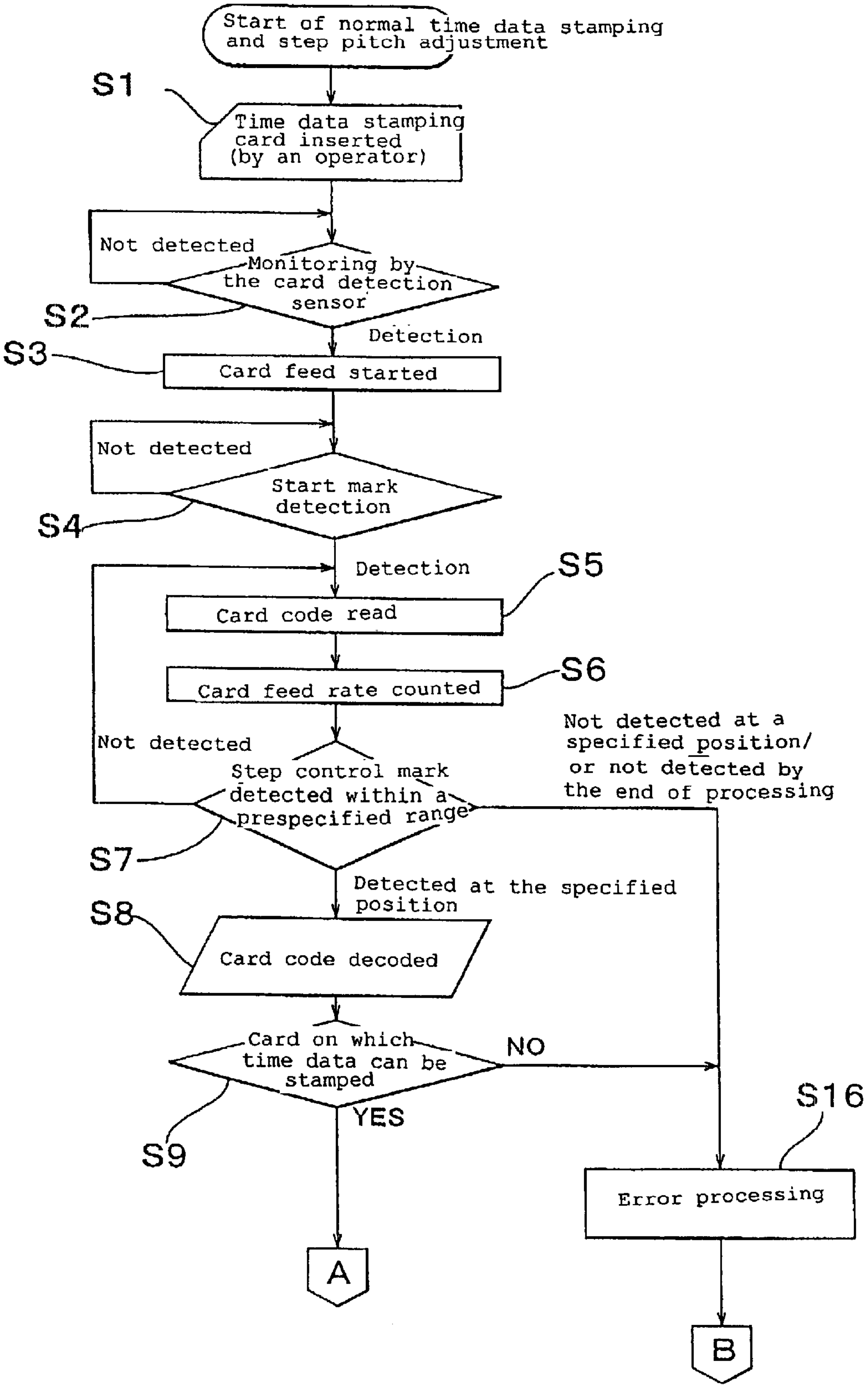
FIG. 6 is a flow chart showing a processing sequence for adjusting a card feed rate in the time recorder according to the present invention as described in claim 2 and by using the time card according to the present invention shown in FIG. 5.
Figure 7:
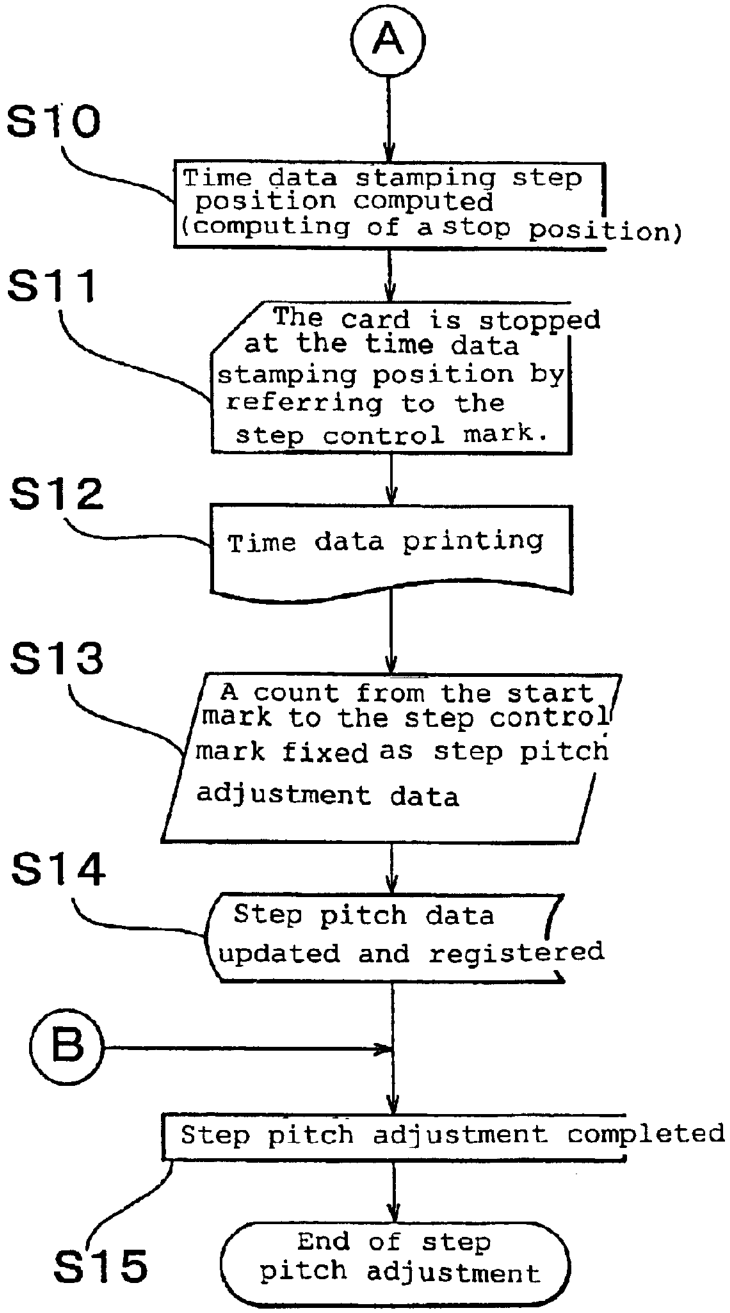
FIG. 7 is a flow chart showing a subsequent portion of the flow chart shown in FIG. 6.

FIG. 6 and FIG. 7 show a step pitch adjustment sequence for the operation for stamping one's arrival or departure time performed by using, as a time card (stamping card), the time card TB which is used daily with a the ID code TD as shown in FIG. 5 printed along one edge thereof and also with the start mark TX and end mark T1' (step control mark) for this ID code TD used as a start point and an end point for measurement of the card feed rate, and also by setting the operation mode of the time recorder 1 to the print mode as well as for the step pitch adjustment processing for adjusting the card feed rate, and more specifically the figures show a flow chart for the processing sequence according to the invention as described in claim 2, and the step pitch adjustment processing described above is automatically executed by a program stored in the memory 6 each time an employee's arrival or departure time is printed on the time card TB.

In the flow chart shown in FIG. 6 and FIG. 7, after the start mark TX (start point) is detected in step S4, determination is made in step S7 for whether there is a step control mark, namely the end mark T1' (end point) within a prespecified range or not, and if the end mark T1' is not detected, the card is regarded as an invalid one with the system control shifted to step S16 for processing an invalid card, but when the end mark T1' is detected at the prespecified position, namely when the card is regarded as a valid one, the system control goes into step S8, where the ID code TD is decoded with the system control shifted to step S10 to compute a time data stamping step position (computing a stop position).

The time data stamping position is computed in step S10 by counting a number of pulses detected by the encoder sensor 12 from a point of time when the start mark TX (start point) is detected until a point of time when the end mark T1' is detected and comparing the pulse number to a reference pulse number (step pitch adjustment data) previously stored in the memory 6 to compute the adjustment value, and in the next step S11, the time card TB is fed by the carrier motor 15 based a pulse number adjusted according to this adjustment value and also by referring to the end mark T1' (step control mark) above with the card stopped at the time data stamping position for the current date, and further the system control goes into step S12, where the employee's arrival or departure time is printed by the dot printer 16 in a print column on the correct time data stamping position for the current date.

With the time recorder according to the invention as described in claim 3, a count from a point of time when the start mark TX is detected until a point of time when the end mark T1' is detected is fixed as the step pitch adjustment data in step S13, and the data is registered in the memory to update old data stored therein in step S14 with the time card TB discharged from the insertion port 2 and the processing sequence finished, but whether the step pitch adjustment data should be updated each time printing is performed, or whether the reference data stored in the memory 6 should be used without registering the step pitch adjustment data for updating the contents of the memory 6 like in the invention as described in claim 2 or not may freely be specified by the user.

Figure 8:
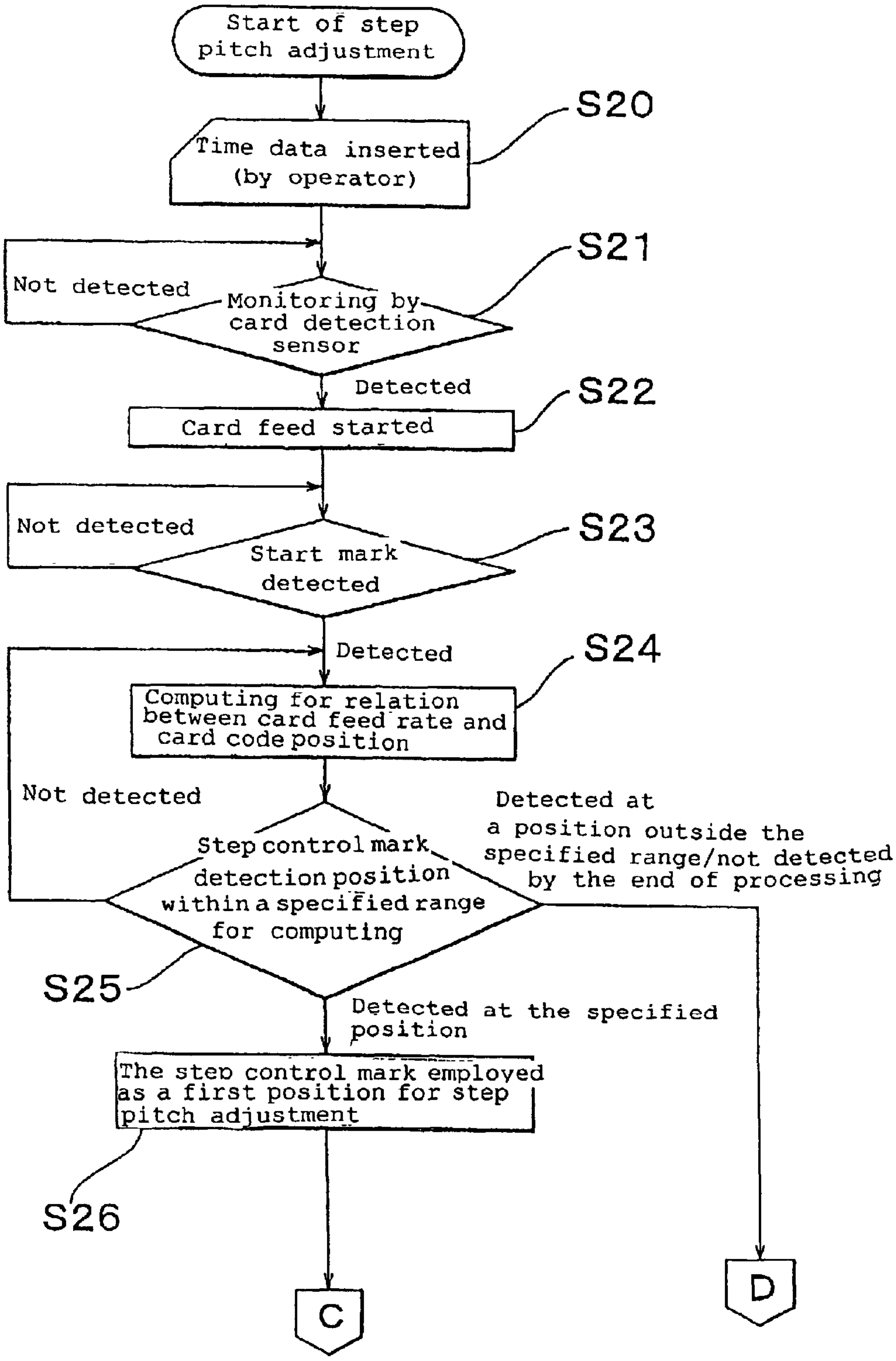
FIG. 8 is a flow chart showing a processing sequence for adjusting a card feed rate in the time recorder according to the present invention as described in claim 1 and by using the time card according to the present invention shown in FIG. 5.
Figure 9:
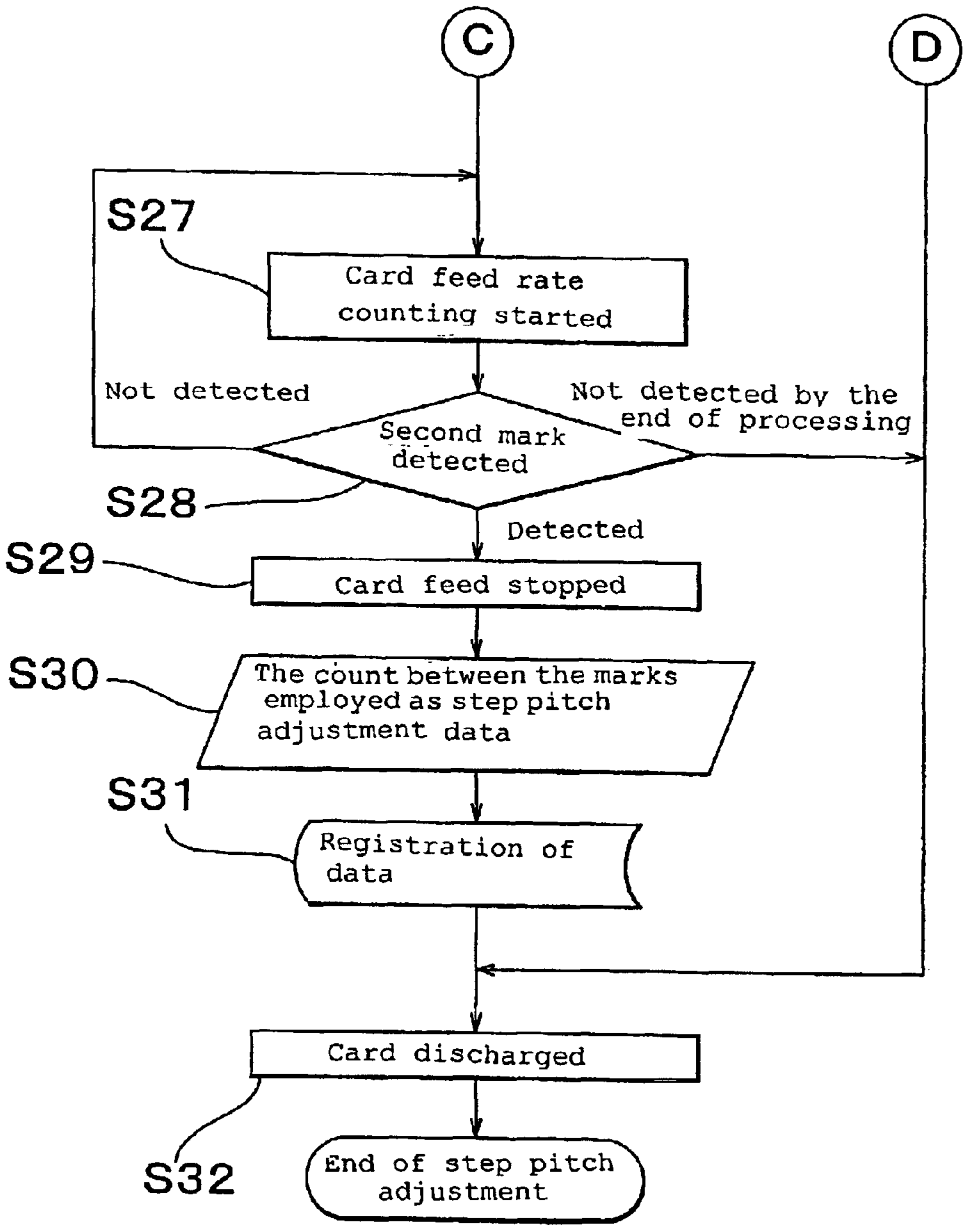
FIG. 9 is a flow chart showing a subsequent portion of the flow chart shown in FIG. 8 above.

FIG. 8 and FIG. 9 are flow charts each illustrating the sequence of step pitch adjustment processing, namely the processing sequence according to the invention as described in claim 1 in which the processing is performed by using as a time card (stamping card) the time card TB which is used daily with a the ID code TD as shown in FIG. 5 printed along one edge thereof and also with the start mark TX and end mark T1' (step control mark) for this ID code TD used as a start point and an end point for measurement of the card feed rate, and further by setting the operation mode of the time recorder 1, and this adjustment processing is performed by the manager periodically or according to the necessity.

In the flow chart shown in FIG. 8 and FIG. 9, after the start mark TX (start point) is detected in step S23, whether the time card is a valid one or not is determined in step S25, and then when the end mark T2' (end point) is detected in step S28, a count from a point of time when the mark TX is detected until a point of time when the mark T2' is fixed as the step pitch adjustment data in step S30 with the data registered in the memory 6 in step S31, and then the time card TB is discharged from the insertion port 2 in step S32 with the processing finished, and from the step S32 and on, each time a time card is inserted into the time recorder 1, card feed by the card carrier motor 15 is adjusted according to the step pitch adjustment data stored in the memory 6, and the employee's arrival or departure time can be printed by the dot printer 16 at a correct position within a print column for the current date.

As described above, with the time recorder with a card feed rate adjustment function according to the present invention and a card which can be used in the time recorder, even when a change occurs in the card feed rate due to a processing error by or a change of the card feed roller through its use for a long time, or even when a time card extends or shrinks due to humidity or for other reasons, the card feed rate can correctly be adjusted by using the same time card as that which is used daily, and therefore the data for arrival and departure times of an employee can always be printed at a correct position within a print column in the stamping step for the current date, and thus the present invention can provide a time recorder which can print data for one's arrival or departure time at a correct position within a print column of a time card and a time card for use in the time recorder.

What is claimed is:

1. A time recorder with the operation mode capable of being switched between a print mode and a set mode and feeding a time card inserted therein up to a data time data stamping step position for stamping a current date with a card carrier motor and stamping the date when the operation mode is switched to the print mode and also adjusting a feed rate for the time card when operation mode is switched to the set mode, said time recorder comprising a sensor for reading a start point and an end point for measurement of a feed rate provided on an inserted time card, an encoder for counting a feed rate of the time card fed from a point of time when the start point is read until a point of time when the end point is read, an adjustment value computing means for computing an adjustment value for adjusting the feed rate by comparing the counted feed rate to a preset basic feed rate, and an adjustment value registration means for registering the computed adjustment value as step pitch adjustment data, each of which is each enabled when the operation mode of the time recorder is switched to the set mode, and said time recorder further comprising a feed rate control means for adjusting a feed rate of the time card by the card carrier motor according to the registered step pitch adjustment data to carry the time card to the time data stamping step position for the current data when the operation mode of the time recorder is set to the print mode.

2. The time recorder with a card feed rate adjustment function according to claim 1, wherein a start mark and an end mark printed with a space therebetween in a lower section and an upper section of a time card respectively are used as a start position and an end position for measurement of a feed rate.

3. The time recorder with a card feed rate adjustment function according to claim 1, wherein a start mark and an end mark of an ID code printed on a time card are used as a start position and an end position for measurement of a feed rate.

4. The time recorder with a card feed rate adjustment function according to claim 1, wherein either one of a start mark or an end mark of an ID code printed on a time card are used as a start point for measurement of a feed rate for the time card and an end mark printed in an upper section of a time card at a position corresponding to the ID code is used as an end point for measurement of a feed rate.

5. The time recorder with a card feed rate adjustment function according to claim 1, wherein either one of a ruled line or a pattern printed along a lower edge of a time card or in a lower section thereof is used as a start position for measurement of a feed rate, and either one of a ruled position and a pattern printed along an upper edge of the time card or in an upper section thereof is used as an end point for measurement of the feed rate.

6. A time recorder with a card feed rate adjustment function capable of feeding a time data stamping step position to an inserted time card with a card carrier motor for stamping a current date, said time recorder comprising a sensor for reading a start position and an end position for measurement of a feed rate provided on the inserted time card, an encoder for counting a feed rate for a time card fed from a point of time when the start point is read until a point of time when the end point is read, an adjustment value computing means for computing an adjustment value for adjusting the feed rate by comparing the counted feed rate to a preset basic feed rate, a print position computing means for computing a time data stamping step position for stamping the current data according to the computed adjustment means, and a feed rate control means for controlling the card carrier mote to carry the time card to the computed time data stamping step position.

7. The time recorder with a card feed rate adjustment function according to claim 6 further comprising an update and registration means for updating and registering a feed rate counted by the encoder as new step pitch adjustment data.

8. The time recorder with a card feed rate adjustment function according to claim 7, wherein a start mark and an end mark printed with a space therebetween in a lower section and an upper section of a time card respectively are used as a start position and an end position for measurement of a feed rate.

9. The time recorder with a card feed rate adjustment function according to claim 7, wherein a start mark and an end mark of an ID code printed on a time card are used as a start position and an end position for measurement of a feed rate.

10. The time recorder with a card feed rate adjustment function according to claim 7, wherein either one of a start mark or an end mark of an ID code printed on a time card are used as a start point for measurement of a feed rate for the time card and an end mark printed in an upper section of a time card at a position corresponding to the ID code is used as an end point for measurement of a feed rate.

11. The time recorder with a card feed rate adjustment function according to claim 7, wherein either one of a ruled line or a pattern printed along a lower edge of a time card or in a lower section thereof is used as a start position for measurement of a feed rate, and either one of a ruled position and a pattern printed along an upper edge of the time card or in an upper section thereof is used as an end point for measurement of the feed rate.

12. The time recorder with a card feed rate adjustment function according to claim 6, wherein a start mark and an end mark printed with a space therebetween in a lower section and an upper section of a time card respectively are used as a start position and an end position for measurement of a feed rate.

13. The time recorder with a card feed rate adjustment function according to claim 6, wherein a start mark and an end mark of an ID code printed on a time card are used as a start position and an end position for measurement of a feed rate.

14. The time recorder with a card feed rate adjustment function according to claim 7, wherein either one of a start mark or an end mark of an ID code printed on a time card are used as a start point for measurement of a feed rate for the time card and an end mark printed in an upper section of a time card at a position corresponding to the ID code is used as an end point for measurement of a feed rate.

15. The time recorder with a card feed rate adjustment function according to claim 6, wherein either one of a ruled line or a pattern printed along a lover edge of a time card or in a lower section thereof is used as a start position for measurement of a feed rate, and either one of a ruled position and a pattern printed along an upper edge of the time card or in an upper section thereof is used as an end point for measurement of the feed rate.

16. A time card used in the time recorder with a card feed rate adjustment function, wherein a start mark as a start position for measurement of a feed rate is printed in a lower section of the card and also an end mark as an end position for measurement of a feed rate is printed at a position corresponding to the start mark in an upper section of the card.

17. A time card used in the time recorder with a card feed rate adjustment function, wherein either one of a start mark and an end mark for an ID code printed on one side of a card is used as a start point for measurement of a feed rate and an end mark used as an end point for measurement of the feed rate is printed at a position corresponding to the ID code.

* * * * *